United States Patent
Suo et al.

(10) Patent No.: US 8,165,151 B2
(45) Date of Patent: Apr. 24, 2012

(54) METHOD, SYSTEM AND TERMINAL FOR IMPLEMENTING UPWARD FREQUENCY HOPPING TRANSMISSION

(75) Inventors: Shiqiang Suo, Beijing (CN); Ruiqi Zhang, Beijing (CN); Shaohui Sun, Beijing (CN)

(73) Assignee: China Academy of Telecommunications Technology, Beijing (CN)

( * ) Notice: Subject to any disclaimer, the term of this patent is extended or adjusted under 35 U.S.C. 154(b) by 248 days.

(21) Appl. No.: 12/526,467

(22) PCT Filed: Feb. 4, 2008

(86) PCT No.: PCT/CN2008/070279
§ 371 (c)(1),
(2), (4) Date: Jan. 11, 2010

(87) PCT Pub. No.: WO2008/098511
PCT Pub. Date: Aug. 21, 2008

(65) Prior Publication Data
US 2010/0111007 A1    May 6, 2010

(30) Foreign Application Priority Data
Feb. 9, 2007    (CN) .......................... 2007 1 0063768

(51) Int. Cl.
*H04L 12/56*    (2006.01)
*H04J 1/16*    (2006.01)

(52) U.S. Cl. ......... 370/436; 370/330; 370/430; 370/442
(58) Field of Classification Search ................. 370/442, 370/430, 330, 436
See application file for complete search history.

(56) References Cited

U.S. PATENT DOCUMENTS

| 8,014,439 B2 * | 9/2011 | Sakamoto et al. ............ 375/219 |
| 2004/0013166 A1 | 1/2004 | Goodings |
| 2004/0037251 A1 | 2/2004 | Shneyour et al. |
| 2006/0176859 A1 | 8/2006 | Lee et al. |
| 2009/0016260 A1 * | 1/2009 | Thesling ....................... 370/321 |

OTHER PUBLICATIONS

International Search Report for PCT/CN2008/070279 mailed May 22, 2008.

* cited by examiner

*Primary Examiner* — John Pezzlo
(74) *Attorney, Agent, or Firm* — Sutherland Asbill & Brennan LLP

(57) ABSTRACT

A method for implementing upward frequency hopping transmission is adopted to the communication system with time slotted frame structure, and it comprises: receiving the frequency band and frequency hopping mode allocated by the network side; after implementing the upward transmission on one frequency band allocated in the first predivided time period based on the frequency hopping mode, hopping to the other allocated frequency band to implement upward transmission in the predivided second time period. A system and terminal for implementing upward frequency hopping transmission are also provided. By the invention, the frequency hopping in a transmission time interval of the alternative frame structure in the Long Term Evolution can be realized and the frequency diversity gain can be acquired.

11 Claims, 6 Drawing Sheets

METHOD, SYSTEM AND TERMINAL FOR IMPLEMENTING UPWARD FREQUENCY HOPPING TRANSMISSION

RELATED APPLICATIONS

This is a submission pursuant to 35 U.S.C. 154(d)(4) to enter the national stage under 35 U.S.C. 371 for PCT/CN2008/070279, filed Feb. 4, 2008. Priority is claimed under 35 U.S.C. 119(a) and 35 U.S.C. 365(b) to international PCT Application No. PCT/CN2008/070279, filed Feb. 4, 2008; and to Chinese Patent Application No. 200700063768.3, filed Feb. 9, 2007. The contents of both applications are hereby incorporated by reference.

This application claims the priority to the Chinese patent application No. 200710063768.3, filed on Feb. 9, 2007 and titled as "Method, System and User Equipment for Implementing Uplink Frequency Hopping Transmission", the contents of which is incorporated hereby in its entirety by reference.

FIELD OF THE INVENTION

The present invention relates to a transmission method in wireless communication technologies, and more particularly, to a method, system and User Equipment for implementing uplink frequency-hopping transmission.

BACKGROUND OF THE INVENTION

Presently, the global wireless communication has tended to be more mobile, more broadband and more IP-based, resulting in fierce competitions in the mobile communication industry. For the purpose of a competitive and dominant role in the mobile communication industry, the 3rd Generation Partner Project (3GPP) put forward the Long Term Evolution (LTE) project, an object of which is to achieve a higher data rate, a lower time delay, an improved system capacity and coverage range, and a lower cost.

The transmission mode of data over a wireless link is an important aspect to be focused on to achieve the object of the LTE. In the current LTE solution, the combination of localized transmission and frequency-hopping transmission, instead of the original distributed transmission mode, is used for the transmission of data. The localized transmission is characterized in that the bandwidth used for data transmission is continuous within a certain time period. In the frequency-hopping transmission, a carrier frequency band used for data transmission hops within a range of certain bandwidth, to reduce the impact of fading and homogenize interferences, so that a frequency diversity gain may be obtained. Particularly, a transmission block is transmitted in subframes at different frequency bands during a Transmission Time Interval (TTI).

The LTE is a communication system utilizing a time slot based frame structure, and includes a frequency division duplex mode and a time division duplex mode in terms of a duplex mode. In the time division duplex mode, generally two types of frame structures, i.e. a Generic Frame Structure and an Alternative Frame Structure, may be utilized. The structure of the Generic Frame Structure and the frequency-hopping transmission thereof are described below. FIG. 1 is a schematic diagram illustrating the frame structure of the Generic Frame Structure. As shown in FIG. 1, a wireless frame with a length of 10 ms includes 20 subframes (also referred to as time slots), i.e. subframes #0 to #19 shown in FIG. 1, each having the same length of 0.5 ms, and a TTI of the Generic Frame Structure has a length of 1 ms, which is equal to that of two subframes. Within one TTI, a transmission block is transmitted in two continuous subframes. FIG. 2 is a schematic diagram illustrating the frequency-hopping transmission of the Generic Frame Structure. As shown in FIG. 2, the two subframes are at different frequency bands, particularly, the first subframe is at a frequency band denoted by A, the second subframe is at a frequency band denoted by B, and the first and second subframes are continuous in the frequency domain. Thus, not only requirements of the localized transmission may be satisfied, but also the frequency diversity gain may be obtained.

The frame structure of the Alternative Frame Structure is shown in FIG. 3. As shown, a wireless frame with a length of 10 ms includes two wireless subframes each having a length of 5 ms. Each of the wireless subframes includes 3 special time slots (shown as DwPTS, GP and UpPTS in FIG. 3) and 7 general time slots (e.g. TS0 to TS6 in FIG. 3). The general time slots, each of which has a length of 0.675 ms, are used to for data transmission. A TTI of the Alternative Frame Structure also has a length of 0.675 ms. In this case, a transmission block is transmitted in one time slot of the subframe during the TTI.

Obviously, in the mode of the Alternative Frame Structure, the transmission block is carried by one subframe during the TTI, and it is impossible to obtain a frequency diversity gain since no frequency hopping can be performed for a single subframe in the prior art. Additionally, although the frequency hopping may be implemented between different subframes, because a transmission block within a single TTI is not carried in different subframes, no gain may be obtained for the transmission block through the frequency hopping.

SUMMARY OF THE INVENTION

An object of an embodiment of the present invention is to provide a method, system and User Equipment for implementing uplink frequency-hopping transmission, to overcome the disadvantage in the frequency hopping in the prior art.

To achieve the above object, an embodiment of the present invention provides a method for implementing uplink frequency-hopping transmission, which is applicable to a communication system having a time slot based frame structure, includes:

receiving a notification of frequency bands and a frequency hopping mode allocated by a network side;

performing uplink transmission at one of the allocated frequency bands during a first time period predetermined and then hopping to another allocated frequency band to perform uplink transmission during a second time period predetermined, according to the frequency hopping mode.

Preferably, a User Equipment divides a time slot into the first and second time periods in advance.

Preferably, two frequency bands are allocated, and each of the frequency bands includes at least one Resource Unit (RU). When two or more Resource Units are included in one frequency band, the Resource Units of the frequency band are continuous in frequency domain; and the User Equipment is notified about the allocated frequency bands and the frequency hopping mode.

Preferably, dividing the time slot into the first and second time periods may include:

grouping the forth Long Block and the part before the forth Long Block within the time slot as the first time period, and grouping the part after the forth Long Block within the time slot as the second time period.

Preferably, notifying the User Equipment about the allocated frequency bands may include:

utilizing a bit information mapping table to indicate the Resource Units contained in the two allocated frequency bands, and notifying the bit information mapping table to the User Equipment.

Preferably, notifying the User Equipment about the frequency hopping mode may include:

utilizing a bit of information to indicate the frequency hopping mode from a lower frequency band to a higher frequency band, or from a higher frequency band to a lower frequency band; and notifying the bit of information to the User Equipment.

Preferably, notifying the User Equipment about the allocated frequency bands and the frequency hopping mode may include:

notifying the User Equipment about a starting index and an ending index of the Resource Units in the frequency band used in the first time period, and a starting index and an ending index of the Resource Units in the frequency band used in the second time period.

Preferably, notifying the User Equipment about the allocated frequency bands and the frequency hopping mode may include:

notifying the User Equipment about a starting index and the number of the Resource Units of the frequency band used in the first time period, and a starting index and the number of the Resource Units of the frequency band used in the second time period.

Preferably, performing, by the User Equipment, uplink transmission at one of the allocated frequency bands during the first time period and then hopping to the other allocated frequency band to perform uplink transmission during the second time period, according to the frequency hopping mode, may include:

transmitting, by the User Equipment, uplink reference symbols of the User Equipment via Short Blocks in idle frequency bands corresponding to the User Equipment during the first and second frequency bands.

Preferably, transmitting the uplink reference symbols of the User Equipment through the Short Blocks in idle frequency bands corresponding to the User Equipment may further include:

multiplexing the uplink reference symbols of the User Equipment and uplink reference symbols of another User Equipment over the Short Blocks.

Preferably, the two allocated frequency bands may be adjacent in the frequency domain.

An embodiment of the present invention further provides a system for implementing uplink frequency-hopping transmission, and the system includes a network side and a User Equipment, the User Equipment includes a scheduling information receiving and forwarding unit, and an uplink frequency-hopping transmitting unit; and the network side includes a frequency band allocation unit, a frequency hopping mode designating unit, and a scheduling information sending unit.

The frequency band allocation unit is adapted to allocate two frequency bands, each of which includes at least one Resource Unit, and when two or more Resource Units are included in the frequency band, the Resource Units are continuous in the frequency domain.

The frequency hopping mode designating unit is adapted to designate a frequency hopping mode.

The scheduling information sending unit is adapted to notify the allocated frequency bands and the frequency hopping mode to the User Equipment.

The scheduling information receiving and forwarding unit is adapted to receive and forward the notification of the allocated frequency bands and the frequency hopping mode to the uplink frequency-hopping transmitting unit.

The uplink frequency-hopping transmitting unit is adapted to transmit data at one of the allocated frequency bands during the first time period and then hop to the other allocated frequency band to transmit data during the second time period, according to the frequency hopping mode.

Preferably, the system further includes a time slot dividing unit, which is adapted to divide a time slot into a first time period and a second time period in advance.

An embodiment of the present invention further provides a User Equipment for implementing uplink frequency-hopping transmission, and the User Equipment includes a scheduling information receiving and forwarding unit, and an uplink frequency-hopping transmitting unit.

The scheduling information receiving and forwarding unit is adapted to receive and forward the notification of the allocated frequency bands and the frequency hopping mode to the uplink frequency-hopping transmitting unit.

The uplink frequency-hopping transmitting unit is adapted to transmit data at one of the allocated frequency bands during a first time period predetermined and then hop to another allocated frequency band to transmit data during a second time period predetermined, according to the frequency hopping mode.

Preferably, the User Equipment further includes a time slot dividing unit, which is adapted to divide a time slot into the first and second time periods in advance.

An embodiment of the present invention further provides a system for implementing uplink frequency-hopping transmission, and the system includes a network side and a User Equipment, the User Equipment includes a scheduling information receiving, parsing and forwarding unit, and an uplink frequency-hopping transmitting unit; and the network side includes a frequency band sequently-allocating unit and a scheduling information sending unit.

The frequency band sequently-allocating unit is adapted to allocate two frequency bands in the order of the time periods, each of the allocated frequency bands includes at least one Resource Unit, and when two or more Resource Units are included in the frequency band, the Resource Units are continuous in the frequency domain.

The scheduling information sending unit is adapted to notify the allocated frequency bands to the User Equipment.

The scheduling information receiving, parsing and forwarding unit is adapted to receive the notification of the transmitted frequency bands, obtain a frequency hopping mode by parsing the order of the time periods for the two frequency bands, and forward the notification of the allocated frequency bands and the obtained frequency hopping mode to the uplink frequency-hopping transmitting unit.

The uplink frequency-hopping transmitting unit is adapted to transmit data at one of the allocated frequency bands during a first time period predetermined and then hop to another allocated frequency band to transmit data during a second time period predetermined, according to the frequency hopping mode.

Preferably, the User Equipment further includes a time slot dividing unit, which is adapted to divide a time slot into the first time period and the second time period in advance.

An embodiment of the present invention further provides a User Equipment for implementing uplink frequency-hopping transmission, and the User Equipment includes a scheduling information receiving, parsing and forwarding unit, and an uplink frequency-hopping transmitting unit.

The scheduling information receiving, parsing and forwarding unit is adapted to receive a notification of the transmitted frequency bands, obtain a frequency hopping mode by parsing the order of the time periods for the two frequency bands, and forward the notification of the allocated frequency bands and the obtained frequency hopping mode to the uplink frequency-hopping transmitting unit.

The uplink frequency-hopping transmitting unit is adapted to transmit data at one of the allocated frequency bands during a first time period predetermined and then hop to another allocated frequency band to transmit data during a second time period predetermined, according to the frequency hopping mode.

Preferably, the User Equipment further includes a time slot dividing unit, which is adapted to divide a time slot into the first time period and the second time period in advance.

As can be seen from the above technical solutions provided in the embodiments of the invention, the time slot is divided in advance into the first time period and the second time period, two groups of RUs are allocated to the two frequency bands used for the frequency hopping, and the allocated frequency bands and the frequency hopping mode are notified to the User Equipment, which transmits data at one of the allocated frequency bands during the first time period and then hop to the other allocated frequency band to transmit data during the second time period, according to the frequency hopping mode, so that the frequency hopping may be implemented within one TTI in the Alternative Frame Structure system, thereby obtaining the frequency diversity gain.

BRIEF DESCRIPTION OF THE DRAWINGS

FIG. 4-1 and FIG. 4-2 are diagrams illustrating the time slot structures of the Alternative Frame Structure in the cases of a short Cyclic Prefix (CP) and a long Cyclic Prefix, respectively, according to an embodiment of the invention.

FIG. 6-1 and FIG. 6-2 are time slot structure diagrams illustrating a time slot divided into two time periods in the cases of the short CP and long CP, respectively, according to embodiments of the invention.

DETAILED DESCRIPTION OF THE EMBODIMENTS

In the method for implementing uplink frequency-hopping transmission provided in an embodiment of the present invention, a time slot is divided in advance into a first time period and a second time period, two groups of continuous Resource Units are allocated to two frequency bands used for frequency hopping, and the allocated frequency bands and a frequency hopping mode are notified to a User Equipment, which transmits data at one of the allocated frequency bands during the first time period and hops to the other allocated frequency band to transmit data during the second time period according to the frequency hopping mode.

It will be appreciated by those skilled in the art that a transmission block to be transmitted needs to be processed with an error-correcting code and channel coding, and the frequency diversity gain can be achieved by combining the error-correcting code and the channel coding. If the data of a transmission block in one TTI has a transmission bandwidth larger than the coherent bandwidth of the carrier, a selective fading may occur to the transmission block in the frequency domain. The selective fading may be partially eliminated using the error-correcting code and the channel coding, and a decoding gain may be obtained from the transmission information not subjected to the selective fading during channel decoding, which is equivalent to that a frequency diversity gain is obtained. Particularly, as described above with reference to FIG. 2, during one TTI, a part of the transmission block is transmitted at the frequency band B during the first time period, and the other part of the transmission block is transmitted at the frequency band A during the second time period, as a result, the frequency diversity gain may be achieved through the frequency hopping within the TTI. However, since different transmission blocks are transmitted within different TTIs, with different error-correcting codes being used for the different transmission blocks, it is impossible to eliminate the selective fading using the different error-correcting codes and the channel coding, and hence no frequency diversity gain may be achieved. In view of the above, no frequency diversity gain may be achieved in the case of the Alternative Frame Structure in the prior art.

For the better understanding of the solutions in the embodiments of the present invention by those skilled in the art, the following techniques are firstly described before the description of the embodiments of the present invention.

Figure 1:
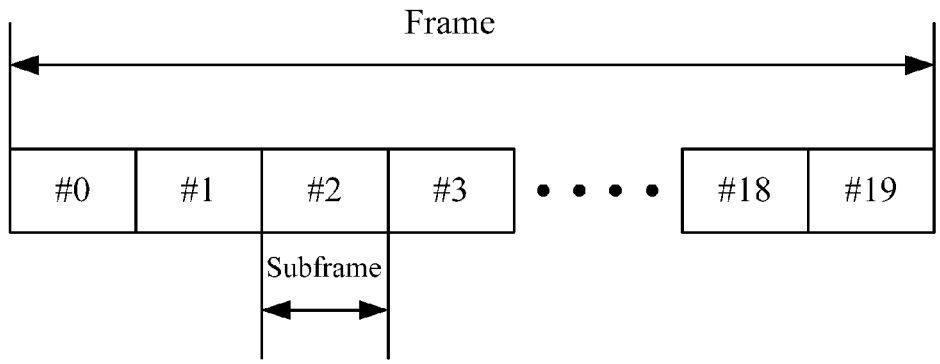
FIG. 1 is a schematic diagram illustrating the frame structure of the Generic Frame Structure in the prior art.
Figure 2:
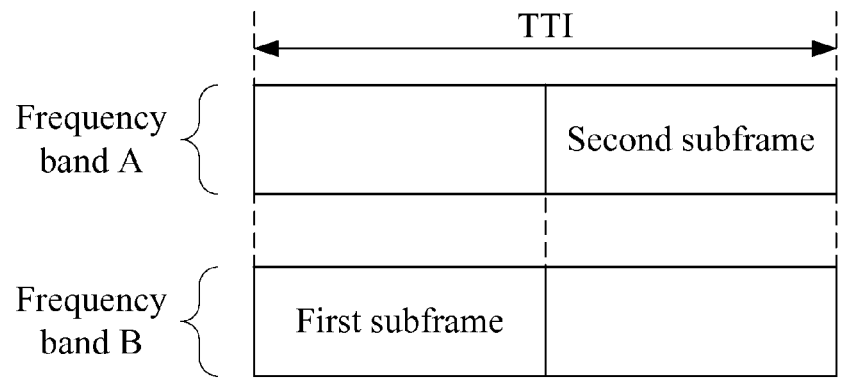
FIG. 2 is a schematic diagram illustrating the frequency-hopping transmission of the Generic Frame Structure in the prior art.
Figure 3:
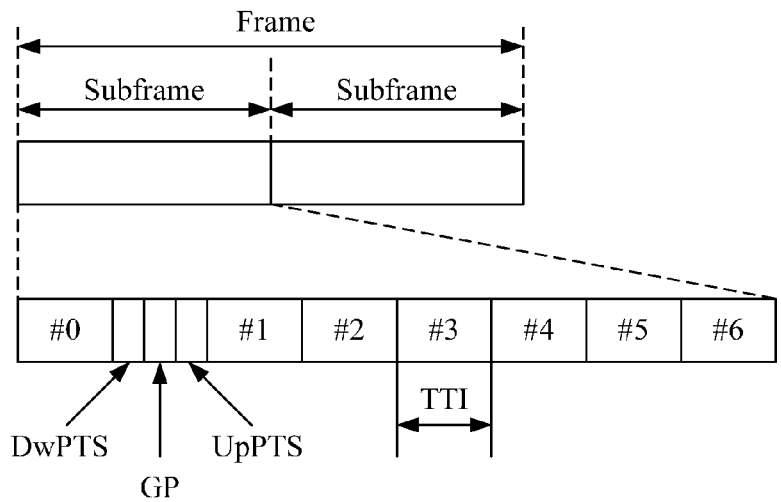
FIG. 3 is a schematic diagram illustrating the frame structure of the Alternative Frame Structure in the prior art.
Figures 1, 4:
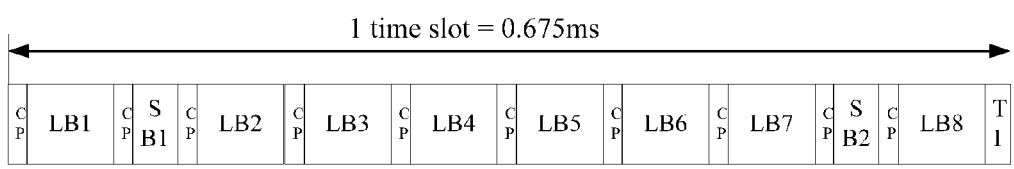
Figures 2, 4:
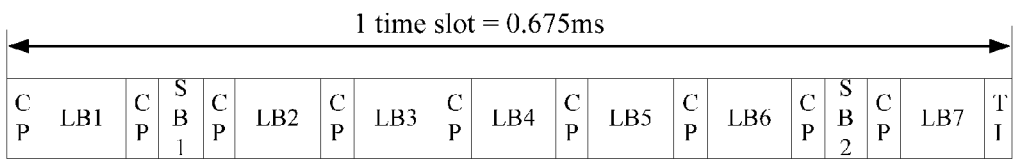

The structure of a time slot of the Alternative Frame Structure is shown in each of FIGS. 4-1 and 4-2 and is described now. The structures in the cases of a short CP and a long CP are shown in FIG. 4-1 and FIG. 4-2, respectively, and CPs, SBs, LBs, and a TI are included in both cases. It will be appreciated by those skilled in the art that the Orthogonal Frequency Division Multiplexing (OFDM) technology is used in the LTE. The CP denotes a cyclic prefix added to each OFDM symbol to overcome the inter-symbol interference due to multipath; a Short Block (SB) is used to transmit a pilot; a Long Block (LB) is used to transmit data and control signaling. The SB has a length which is half of that of the LB. A Time Interval (TI) denotes a time interval between time slots. In the case that short CPs are used, 7 LBs and 2 SBs are contained in a time slot; and in the case that long CPs are used, 8 LBs and 2 SBs are contained in the time slot.

In addition, for a system employing the Alternative Frame Structure, uplink physical resources of a subframe may be divided into a number of Resource Units in the frequency domain. An RU has duration the same as a time slot in the time domain, i.e. 0.675 ms, and includes k sub-carriers in the frequency domain, where k may be equal to, for example, 12. For the sake of scheduling, all the RUs in the time slot are indexed in the prior art, and RUs that are succeeding in the frequency domain have continuous indexes. Thus, in the case of uplink localized transmission, a base station schedules the physical resources, to allocate a group of continuous RUs to a User Equipment for uplink transmission. The method for implementing the uplink frequency-hopping transmission provided in an embodiment of the present invention also takes the allocations of RUs into consideration.

The invention is further described in detail below in connection with the accompanying drawings and embodiments.

Figure 5:
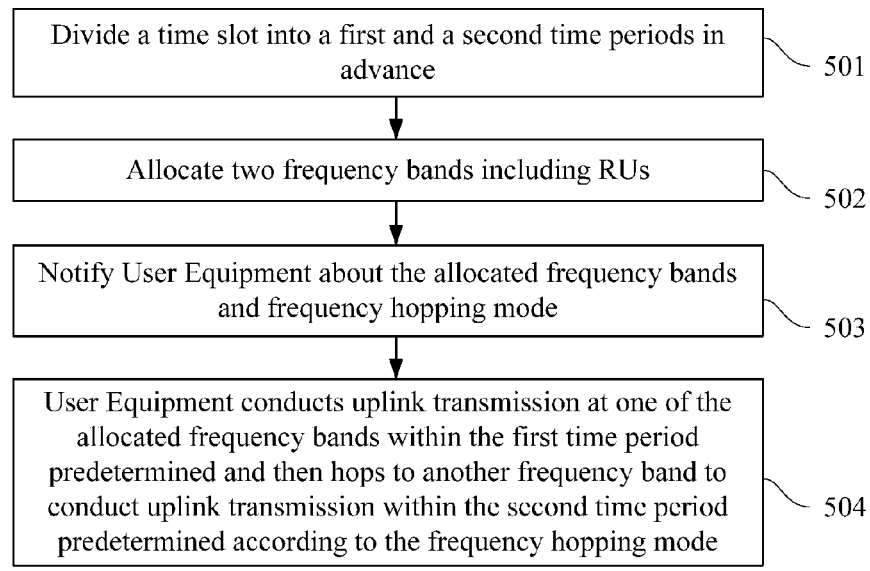
FIG. 5 is a flow chart of the method according to an embodiment of the invention.

A method for implementing the uplink frequency-hopping transmission is shown in FIG. 5, and the method includes the following processes.

Process 501: A time slot is divided in advance into a first time period and a second time period.

Figures 1, 6:
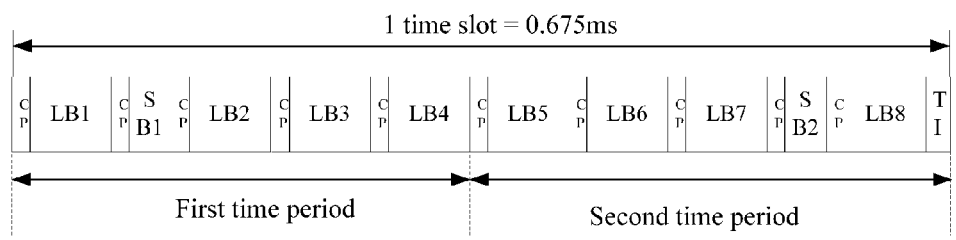
Figures 2, 6:
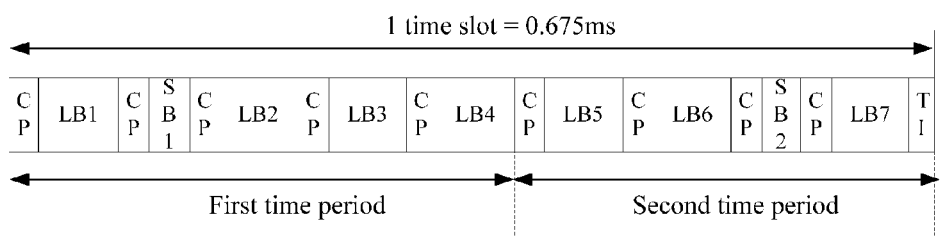

Each of FIG. 6-1 and FIG. 6-2 shows a structure of a time slot divided into two time periods. LB1 to LB4, CPs before LB4, and SB1 belong to the first time period, and the remaining of the time slot belong to the second time period. FIG. 6-1 shows the structure in the case of the short CP, and FIG. 6-2 shows the structure in the case of the long CP.

Process 502: Two frequency bands containing RUs are allocated.

Frequency bands containing RUs are required to be allocated to a User Equipment for uplink transmission, and the allocated RUs are continuous in the prior art, in order to facilitate the scheduling. In Process 502, each of the allocated two frequency bands includes at least one RU, and when two or more RUs are included in the frequency band, the RUs in the frequency band are continuous. The numbers of the two groups of RUs in the two frequency bands may be the same or different from each other and may be determined by a scheduler, and further description thereof is omitted herein.

Process 503: The allocated frequency bands and a frequency-hopping mode are notified to the User Equipment.

In Process 503, the allocated RUs in the previous process may be notified to the User Equipment using a resource mapping information table (e.g. a bitmap). If 8 RUs are available for the uplink, a resource may be mapped to a bitmap shown in Table 1 below.

TABLE 1

Resource mapping map of RUs

| | RU Index | | | | | | | |
|---|---|---|---|---|---|---|---|---|
| | 0 | 1 | 2 | 3 | 4 | 5 | 6 | 7 |
| Indication information | 1 | 1 | 0 | 0 | 0 | 1 | 1 | 0 | where, indication information 0 means that the corresponding RU is not yet allocated to the User Equipment, and indication information 1 means that the corresponding RU has been allocated to the User Equipment.

It is indicated above that a group of RUs including RUs 0 and 1 and another group of RUs including RUs 5 and 6 are allocated, and each of the two groups of RUs are continuous.

The frequency hopping mode may indicate a frequency hopping from a lower frequency band to a higher frequency band, or a frequency hopping from the higher frequency band to the lower frequency band. If taking the form of the bit information mapping table (i.e. bitmap), the resource mapping indication needs an additional bit of information to notify the User Equipment about the frequency hopping mode, compared with the resource mapping indication in the case of localized transmission in the prior art. For example, the additional bit may be added and defined that its value of 0 indicates the frequency hopping from a lower frequency band to a higher frequency band and its value of 1 indicates the frequency hopping from a higher frequency band to a lower frequency band; alternatively, the additional bit may be defined that its value of 1 indicates the frequency hopping from a lower frequency band to a higher frequency band and its value of 0 indicates the frequency hopping from a higher frequency band to a lower frequency band.

The resource mapping indication may also take such a form that a starting index and an ending index of the RUs are notified to the User Equipment. In this case, the resource mapping indication needs additional information to indicate the starting index and ending index of the RUs of the second frequency band. Typically, the starting and ending indexes of the RUs are in an increasing order, and the User Equipment may be notified of the starting and ending indexes of the RUs in the first time period and the starting and ending indexes of the RUs in the second time period, so that the frequency hopping mode may be notified implicitly to the User Equipment.

Again, if RUs 0 to 7 are available for the uplink transmission, and the User Equipment is to be notified that RUs 1 to 3 and 5 to 7 are available for it, then the resource mapping indication used to notify the User Equipment about the starting and ending indexes of the RUs may be as shown in Table 2 below.

TABLE 2

Resource mapping indication table implying the frequency hopping from a lower frequency band to a higher frequency band

| | Information of the first time period | | Information of the second time period | |
|---|---|---|---|---|
| Starting and ending indexes of RUs | 1 | 3 | 5 | 7 |

As shown in Table 2, RUs 1 to 3 are used for the first time period and RUs 5 to 7 are used for the second time period, that is, a lower frequency band is used for the first time period and a higher frequency band is used for the second time period, which implicitly indicates a frequency hopping mode from a lower frequency band to a higher frequency band.

On the contrary, if the resource mapping indication used to notify the User Equipment about the starting and ending indexes of RUs is as shown in Table 3 below,

TABLE 3

Resource mapping indication table implying the frequency hopping from a higher frequency band to a lower frequency band

| | Information of the first time period | | Information of the second time period | |
|---|---|---|---|---|
| Starting and ending indexes of RUs | 5 | 7 | 1 | 3 | which shows that RUs 5 to 7 are used for the first time period and RUs 1 to 3 are used for the second time period, then it will be appreciated that a higher frequency band is used for the first time period and a lower frequency band is used for the second time period, which implicitly indicates a frequency hopping mode from a higher frequency band to a lower frequency band.

Alternatively, the frequency hopping mode may be indicated implicitly by such a manner that the starting index of RUs and the number of the RUs are notified to the User Equipment, as shown in Table 4 below.

TABLE 4

Resource mapping indication table implying the frequency hopping from a lower frequency band to a higher frequency band

| Information of the first time period | | Information of the second time period | |
|---|---|---|---|
| RU starting index | Number of RUs | RU starting index | Number of RUs |
| 1 | 3 | 5 | 3 |

As shown in Table 4, 3 RUs are used for the first time period, with the RU starting index being 1, that is, RUs 1 to 3 are used for the first time period; further, 3 RUs are used for the second time period, with the RU starting index being 5, that is, RUs 5 to 7 are used for the second time period. In this case, a lower frequency band is used for the first time period and a higher frequency band is used for the second time period, which also implicitly indicates a frequency hopping mode from a lower frequency band to a higher frequency band.

Likewise, the frequency hopping mode from a higher frequency band to a lower frequency band may be implied by indicating the RU starting index and the number of RUs, and further description thereof is omitted herein.

Process 504: The User Equipment conducts uplink transmission at one of the allocated frequency bands during the first time period predetermined and hops to the other allocated frequency band to conduct the uplink transmission during the second time period predetermined according to the frequency hopping mode.

In Process 504, within the unique time slot in one TTI, the User Equipment transmits data at an allocated frequency band during the first time period and then hops to another allocated frequency band to transmit data during the second time period, according to the frequency hopping mode. Thus, the frequency hopping may be implemented within one TTI in the uplink transmission of the Alternative Frame Structure system, thereby obtaining the frequency diversity gain.

Figure 7:
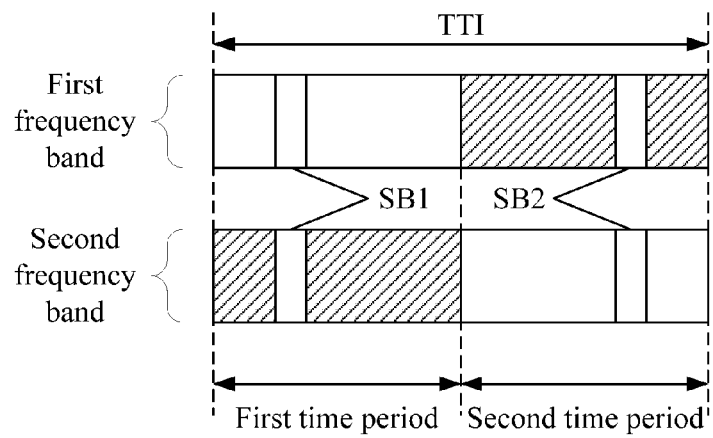
FIG. 7 illustrates the transmission according to an embodiment of the present invention, without frequency hopping being performed on SBs.

In Process 504, SB1 and SB2 are transmitted according to the time periods and frequency bands which are determined by the frequency hopping mode, to carry related information of a User Equipment which is used for data demodulation. The related information of the User Equipment may, for example, include uplink reference symbols. Alternatively, SB1 and SB2 may be transmitted without frequency hopping, and SBs in both the time periods are transmitted at the same frequency band. That is, SBs may be also transmitted at an idle frequency band of the User Equipment. In this way, both SB1 and SB2 may be transmitted at the same frequency band. As shown in FIG. 7, in the first time period, data of a first User Equipment is transmitted at the second frequency band and SB1 includes the related reference symbols of the first User Equipment; in the second time period, SB2 transmitted at the second frequency band also includes the related reference symbols of the first User Equipment. As a result, the reference symbols of the first User Equipment are transmitted via both SBs at the same frequency band, thereby improving the performance of the channel estimation, and improving transmission performance. On the other hand, no data of the User Equipment is transmitted via the Long Blocks at the second frequency band within the second time period, and hence these Long Blocks may be used to transmit data of a second User Equipment. Likewise, the data of the second User Equipment may also be transmitted at the first frequency band within the first time period, as a result, the data of the second User Equipment may be transmitted at the frequency band in the idle time period while the data of the first User Equipment is transmitted through uplink frequency-hopping transmission, so that the wireless resource utilization may be improved. In this case, SBs are required to transmit the related information of these two User Equipments, for example, by multiplexing the related information of these two User Equipments in a frequency division or code division manner.

However, in the manner described above, the related information of the same User Equipment is transmitted respectively at two discontinuous frequency bands used for the same SB, therefore, the single-carrier feature of OFDM in the LTE is not maintained. To maintain the single-carrier feature, it is possible to set the first frequency band and the second frequency band to be continuous during scheduling.

Figure 8:
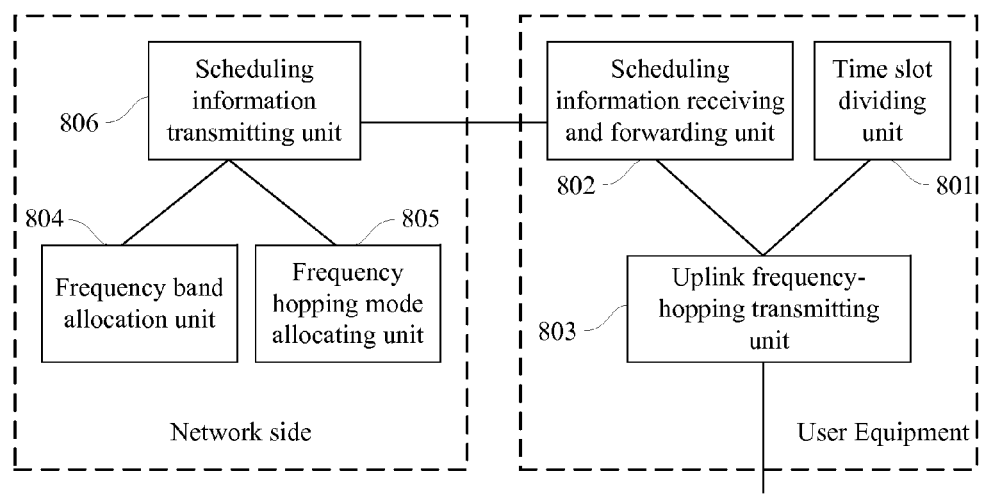
FIG. 8 is a block diagram illustrating a system according to an embodiment of the invention.

A system for implementing uplink frequency-hopping transmission according to an embodiment of the present invention is described below, and the system is shown in FIG. 8.

As shown in FIG. 8, the system in the embodiment of the invention includes a network side and a User Equipment. The User Equipment includes a scheduling information receiving and forwarding unit 802, and an uplink frequency-hopping transmitting unit 803. Preferably, the User Equipment may further include a time slot dividing unit 801. The network side includes a frequency band allocation unit 804, a frequency hopping mode designating unit 805, and a scheduling information sending unit 806.

The time slot dividing unit 801 is connected to the uplink frequency-hopping transmitting unit 803, and is adapted to divide in advance a time slot into a first time period and a second time period.

The frequency band allocation unit 804 is connected to the scheduling information sending unit 806, and is adapted to allocate two frequency bands, each of which includes at least one Resource Unit, and when two or more Resource Units are included in the frequency band, the Resource Units are continuous in the frequency domain.

The frequency hopping mode designating unit 805 is connected to the scheduling information sending unit 806 and is adapted to designate a frequency hopping mode.

The scheduling information sending unit 806 is connected to the RU allocation unit 804, the frequency hopping mode designating unit 805 and the scheduling information receiving and forwarding unit 802, and is adapted to notify the allocated frequency bands and the frequency hopping mode to the scheduling information receiving and forwarding unit 802 of the User Equipment.

The scheduling information receiving and forwarding unit 802 is connected to the scheduling information sending unit 806, and is adapted to receive and forward the notification of the allocated frequency bands and the frequency hopping mode to the uplink frequency-hopping transmitting unit 803.

The uplink frequency-hopping transmitting unit 803 is connected to the time slot dividing unit 801 and the scheduling information receiving and forwarding unit 802, and is adapted to transmit data at one of the allocated frequency bands during the first time period predetermined and then hop to the other allocated frequency band to transmit data during the second time period predetermined, according to the frequency hopping mode.

The method for implementing the uplink frequency-hopping transmission by using this system is similar to the method described above, and further description thereof is omitted herein.

Figure 9:
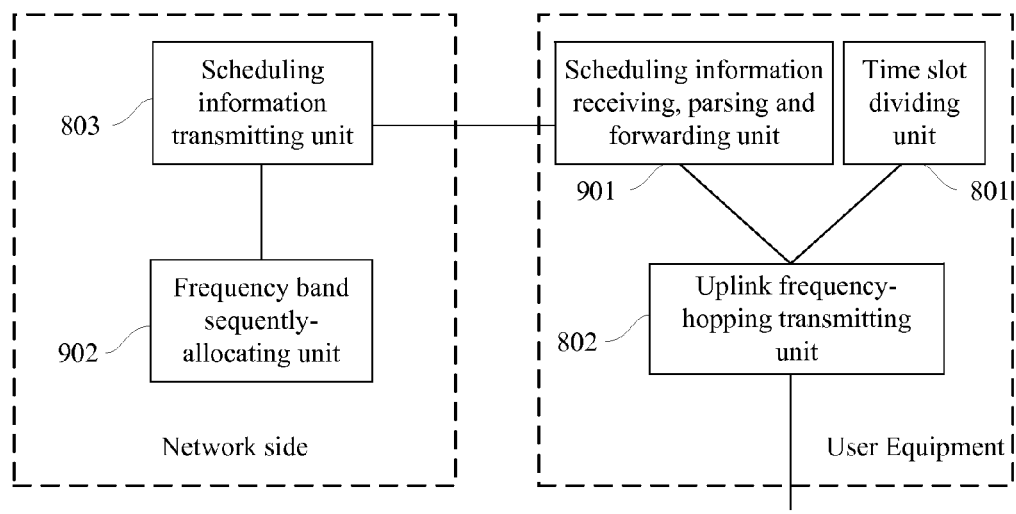
FIG. 9 is a block diagram illustrating another system according to an embodiment of the invention.

Further, an embodiment of the present invention provides another system, as shown in FIG. 9, and the system includes a network side and a User Equipment. The User Equipment includes a scheduling information receiving, parsing and forwarding unit 901, and an uplink frequency-hopping transmitting unit 802. Preferably, the User Equipment may further include a time slot dividing unit 801. The network side includes a frequency band sequently-allocating unit 902 and a scheduling information sending unit 803.

The frequency band sequently-allocating unit 902 is connected to the scheduling information sending unit 803, and is adapted to allocate two frequency bands in the order of time periods. Each of the allocated frequency bands may include at least one Resource Unit, and when two or more Resource Units are included in the frequency band, the Resource Units are continuous in the frequency domain. Here, the allocation of frequency bands in the order of time periods may indicate implicitly the frequency hopping mode, as described in detail above.

The scheduling information sending unit 803 is adapted to notify the allocated frequency bands to the User Equipment.

The scheduling information receiving, parsing and forwarding unit 901 is connected to the scheduling information sending unit 803 and the uplink frequency-hopping transmitting unit 802, and is adapted to receive the transmitted RU allocation information and the notification of the first and second frequency bands used for the frequency hopping, obtain a frequency hopping mode by parsing the RU allocation information, and forward the information on the allocated RUs and the first and second frequency bands, and the obtained frequency hopping mode to the uplink frequency-hopping transmitting unit 802.

The uplink frequency-hopping transmitting unit 802 is adapted to transmit data at one of the allocated frequency bands during the first time period predetermined and then hop to the other allocated frequency band to transmit data during the second time period predetermined, according to the frequency hopping mode.

The method for implementing the uplink frequency-hopping transmission by using this system is similar to the method described above, and further description thereof is omitted herein.

Figure 10:
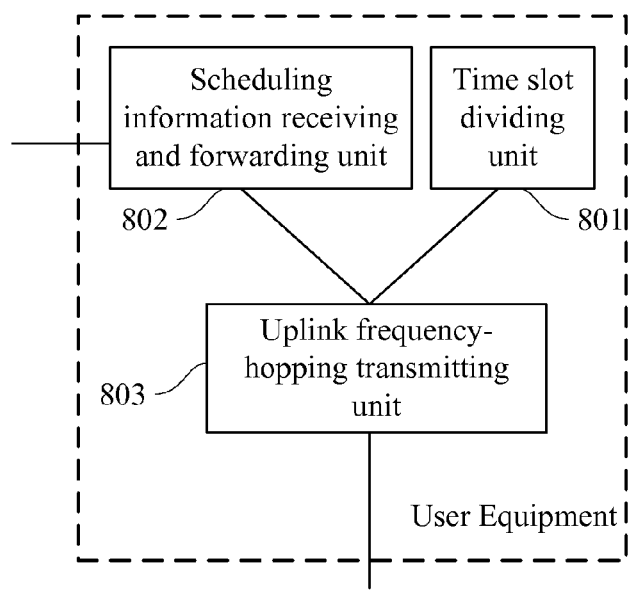
FIG. 10 is a block diagram illustrating a User Equipment according to an embodiment of the invention.

A User Equipment for implementing uplink frequency-hopping transmission according to an embodiment of the present invention is described below, and the User Equipment is shown in FIG. 10. The User Equipment is applicable to the former system described above. The User Equipment includes a scheduling information receiving and forwarding unit 802, and an uplink frequency-hopping transmitting unit 803. Preferably, the User Equipment may further include a time slot dividing unit 801.

The time slot dividing unit 801 is connected to the uplink frequency-hopping transmitting unit 803, and is adapted to divide in advance a time slot into a first time period and a second time period.

The scheduling information receiving and forwarding unit 802 is adapted to receive and forward the notification of the allocated frequency bands and the frequency hopping mode to the uplink frequency-hopping transmitting unit 803.

The uplink frequency-hopping transmitting unit 803 is connected to the time slot dividing unit 801 and the scheduling information receiving and forwarding unit 802, and is adapted to transmit data at one of the allocated frequency bands during the first time period predetermined and then hop to the other allocated frequency band to transmit data during the second time period predetermined, according to the frequency hopping mode.

Figure 11:
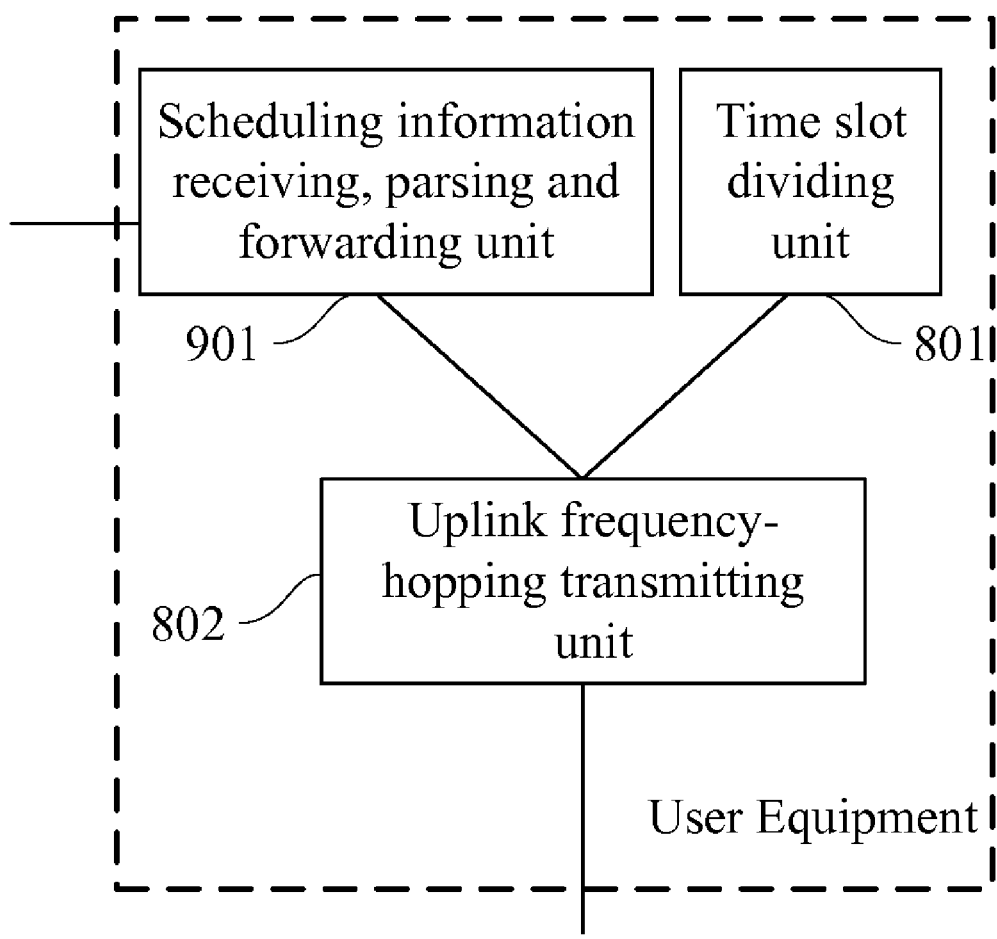
FIG. 11 is a block diagram illustrating another User Equipment according to an embodiment of the invention.

Another User Equipment for implementing the uplink frequency-hopping transmission according to an embodiment of the invention is shown in FIG. 11 and described below. The User Equipment is applicable to the latter system described above and includes a scheduling information receiving, parsing and forwarding unit 901, and an uplink frequency-hopping transmitting unit 802. Preferable, the User Equipment may further include a time slot dividing unit 801.

The time slot dividing unit 801 is connected to the uplink frequency-hopping transmitting unit 803, and is adapted to divide in advance a time slot into a first time period and a second time period.

The scheduling information receiving, parsing and forwarding unit 901 is connected to the scheduling information sending unit 803 and the uplink frequency-hopping transmitting unit 802, and is adapted to receive the notification of the frequency bands, obtain a frequency hopping mode by parsing the order of the time periods of the two frequency bands, and forward the notification of the allocated frequency bands and the obtained frequency hopping mode to the uplink frequency-hopping transmitting unit 802.

The uplink frequency-hopping transmitting unit 803 is connected to the time slot dividing unit 801 and the scheduling information receiving, parsing and forwarding unit 901, and is adapted to transmit data at one of the allocated frequency bands during the first time period predetermined, and then hop to the other allocated frequency band to transmit data during the second time period predetermined, according to the frequency hopping mode.

As can be seen from the embodiments described above, in the invention, the time slot is temporally divided in advance into the first time period and the second time period, two groups of RUs are allocated to the two frequency bands used for the frequency hopping, and the allocated frequency bands and the frequency hopping mode are notified to the User Equipment, which transmits data at one of the allocated frequency bands during the first time period predetermined and then hop to the other allocated frequency band to transmit data during the second time period predetermined, according to the frequency hopping mode, so that the frequency hopping may be implemented within one TTI in the Alternative Frame Structure system, thereby obtaining the frequency diversity gain. It will be appreciated that the division of the time slot in the embodiments of the present invention is not limited. For example, a time slot may be divided in advance into a plurality of time periods, e.g. three time periods and four time periods, depending on an application. The implementation of the invention in the case of dividing in advance a time slot into three or more time periods is similar to that in the case of dividing in advance a time slot into two time periods, and description thereof is omitted herein.

Although the present invention has been described with reference to the embodiments, it will be appreciated by those skilled in the art that various alternations and modifications may be made to the invention, and all the alternations and modifications are intended to be included by the appended claims without departing from the scope of the invention.

The invention claimed is:

1. A method for implementing uplink frequency-hopping transmission, which is applicable to a communication system having a time slot based frame structure, and the frame structure is Alternative Frame Structure in a Long Term Evolution solution, comprising:

dividing in advance, by a User Equipment, a time slot into a first time period and a second time period;

receiving frequency bands and a frequency hopping mode allocated by a network side; and performing uplink transmission at one of the allocated frequency bands during the first time period and then hopping to another allocated frequency band to perform uplink transmission during the second time period, according to the frequency hopping mode;

wherein dividing the time slot into the first time period and the second time period comprises: grouping the forth Long Block and the part before the forth Long Block within the time slot as the first time period, and grouping the part after the forth Long Block within the time slot as the second time period.

2. The method of claim 1, further comprising:

allocating, by the network side, two frequency bands and the frequency hopping mode for the User Equipment, wherein each of the frequency bands comprises at least one Resource Unit, and when two or more Resource Units are comprised in one frequency band, the Resource Units of the frequency band are continuous in frequency domain; and notifying the User Equipment about the allocated frequency bands and the frequency hopping mode.

3. The method of claim 2, wherein notifying the User Equipment about the allocated frequency bands comprises:

utilizing a bit information mapping table to indicate the Resource Units contained in the two allocated frequency bands, and notifying the bit information mapping table to the User Equipment.

4. The method of claim 2, wherein notifying the User Equipment about the frequency hopping mode comprises:

utilizing a bit of information to indicate the frequency hopping mode from a lower frequency band to a higher frequency band, or from a higher frequency band to a lower frequency band; and notifying the bit of information to the User Equipment.

5. The method of claim 2, wherein notifying the User Equipment about the allocated frequency bands and the frequency hopping mode comprises:

notifying the User Equipment about a starting index and an ending index of the Resource Units in the frequency band used in the first time period, and a starting index and an ending index of the Resource Units in the frequency band used in the second time period, or notifying the User Equipment about a starting index and the number of the Resource Units of the frequency band used in the first time period, and a starting index and the number of Resource Units of the frequency band used in the second time period.

6. The method of claim 1, wherein performing, by the User Equipment, uplink transmission at one of the allocated frequency bands during the first time period and then hopping to another allocated frequency band to perform uplink transmission during the second time period, according to the frequency hopping mode comprises:

transmitting, by the User Equipment, uplink reference symbols of the User Equipment via Short Blocks in idle frequency bands corresponding to the User Equipment during the first and second frequency bands.

7. The method of claim 6, wherein transmitting the uplink reference symbols of the User Equipment through the Short Blocks in idle frequency bands corresponding to the User Equipment further comprises:

multiplexing the uplink reference symbols of the User Equipment and uplink reference symbols of another User Equipment over the Short Blocks.

8. The method of claim 7, wherein the allocated frequency bands are adjacent in the frequency domain.

9. The method of claim 6, wherein the allocated frequency bands are adjacent in the frequency domain.

10. A User Equipment for implementing uplink frequency-hopping transmission, which is applicable to a communication system having a time slot based frame structure, and the frame structure is Alternative Frame Structure in a Long Term Evolution solution, comprising a time slot dividing unit, a scheduling information receiving and forwarding unit, and an uplink frequency-hopping transmitting unit, wherein the time slot dividing unit is adapted to divide in advance a time slot into a first time period and a second time period;

the scheduling information receiving and forwarding unit is adapted to receive and forward the notification of allocated frequency bands and a frequency hopping mode to the uplink frequency-hopping transmitting unit; and the uplink frequency-hopping transmitting unit is adapted to transmit data at one of the allocated frequency bands during the first time period and then hop to another allocated frequency band to transmit data during the second time period, according to the frequency hopping mode;

wherein the time slot dividing unit is adapted to group the forth Long Block and the part before the forth Long Block within the time slot as the first time period, and group the part after the forth Long Block within the time slot as the second time period.

11. A system for implementing uplink frequency-hopping transmission, comprising a network side and a User Equipment, the User Equipment comprising a time slot dividing unit, a scheduling information receiving, parsing and forwarding unit, and an uplink frequency-hopping transmitting unit; the network side comprising a frequency band sequently-allocating unit and a scheduling information sending unit, wherein the frequency band sequently-allocating unit is adapted to allocate two frequency bands in the order of the time periods, each of the allocated frequency bands comprises at least one Resource Unit, and when two or more Resource Units are comprised in the frequency band, the Resource Units are continuous in the frequency domain;

the scheduling information sending unit is adapted to notify the allocated frequency bands to the User Equipment;

the time slot dividing unit is adapted to divide in advance a time slot into a first time period and a second time period;

the scheduling information receiving, parsing and forwarding unit is adapted to receive the notification of the transmitted frequency bands, obtain a frequency hopping mode by parsing the order of the time periods for the two frequency bands, and forward the notification of the allocated frequency bands and the obtained frequency hopping mode to the uplink frequency-hopping transmitting unit; and the uplink frequency-hopping transmitting unit is adapted to transmit data at one of the allocated frequency bands during the first time period and then hop to another allocated frequency band to transmit data during the second time period, according to the frequency hopping mode;

wherein the time slot dividing unit is adapted to group the forth Long Block and the part before the forth Long Block within the time slot as the first time period, and group the part after the forth Long Block within the time slot as the second period.

* * * * *